Figure 2:
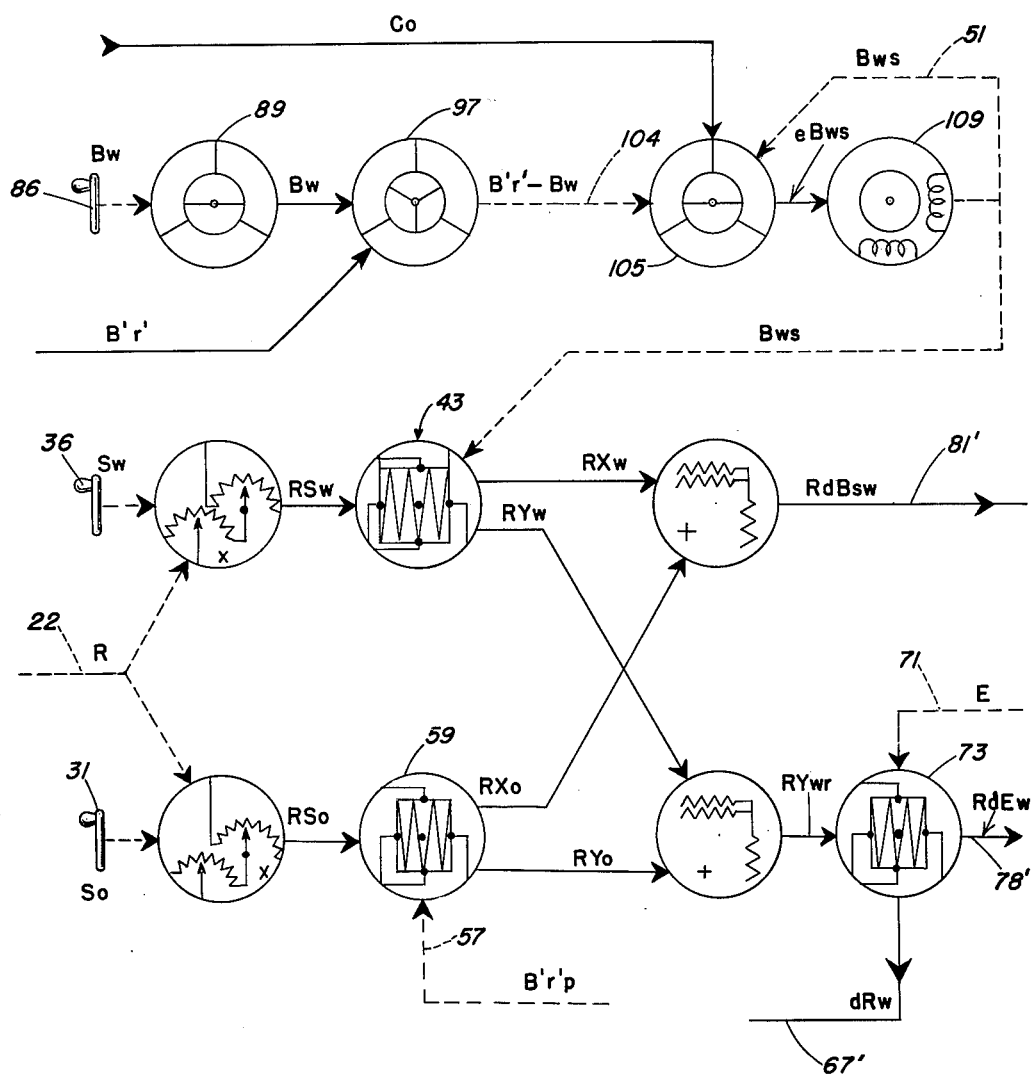

June 5, 1956  C. W. MILLER  2,749,039
WIND RESOLUTION APPARATUS
Filed April 26, 1949  4 Sheets-Sheet 1
FIG. IA
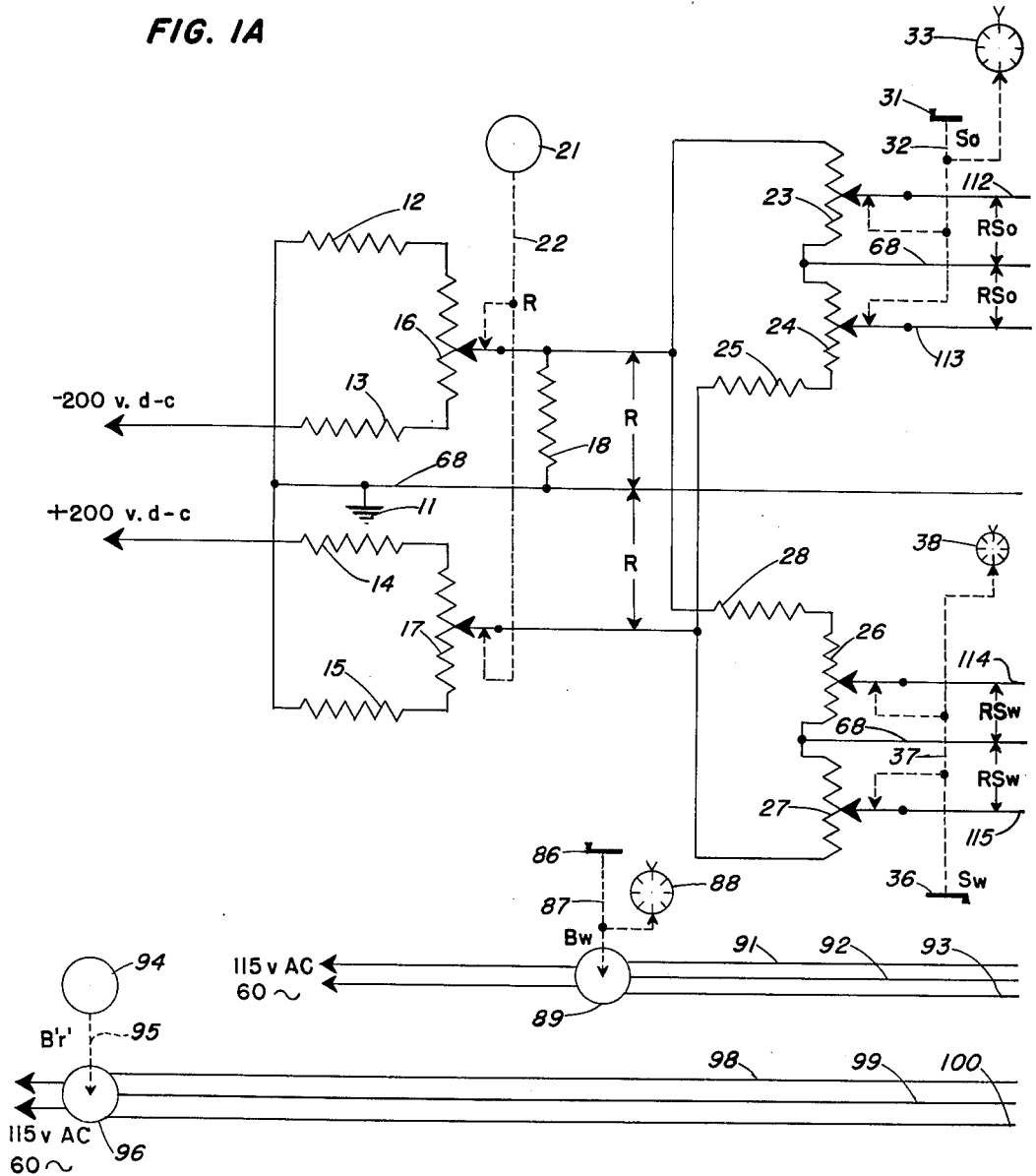
INVENTOR
CARLTON W. MILLER
BY
ATTORNEY June 5, 1956
C. W. MILLER
2,749,039
WIND RESOLUTION APPARATUS
Filed April 26, 1949
4 Sheets-Sheet 2
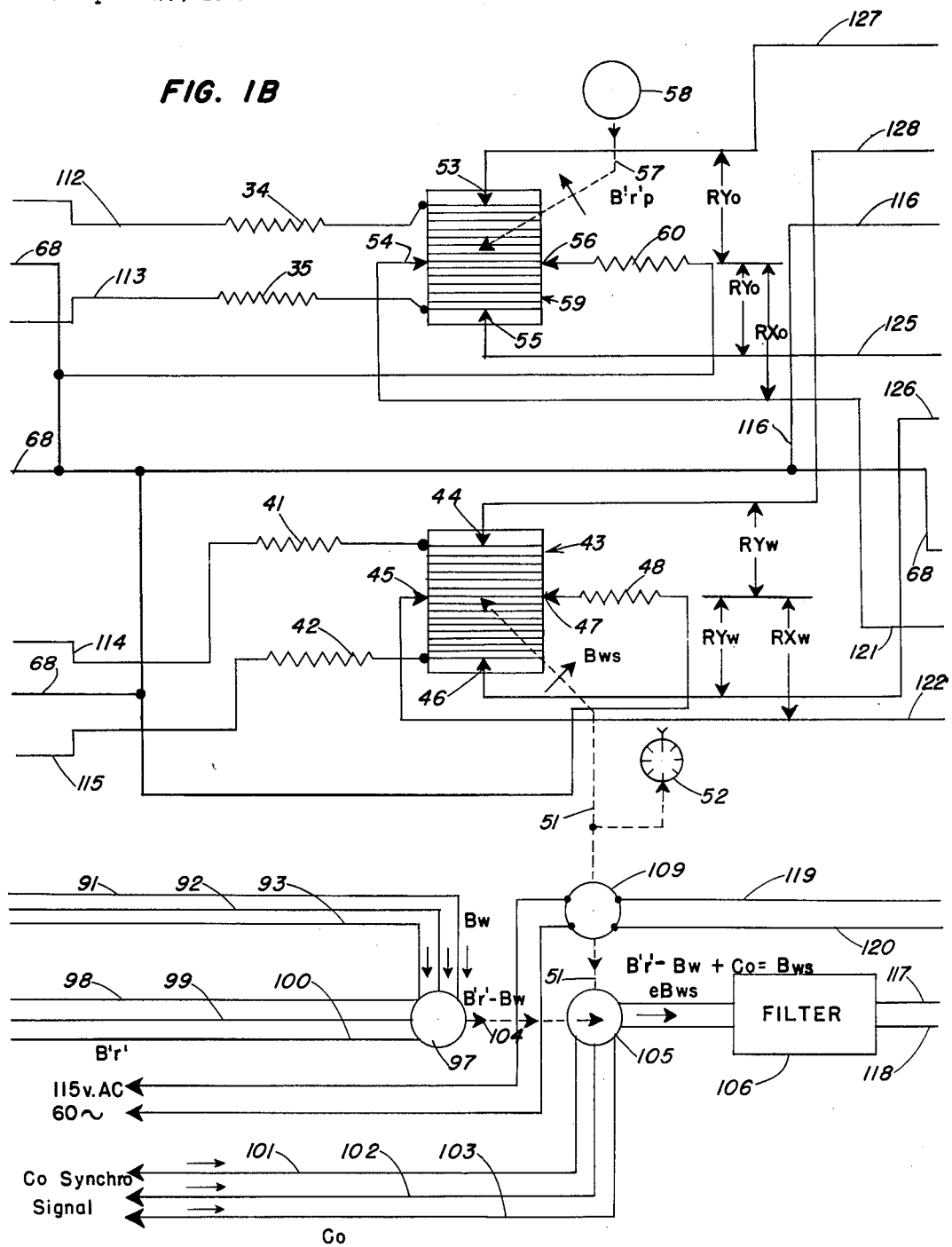
INVENTOR
CARLTON W. MILLER
BY
*G. D. O'Brien*
ATTORNEY

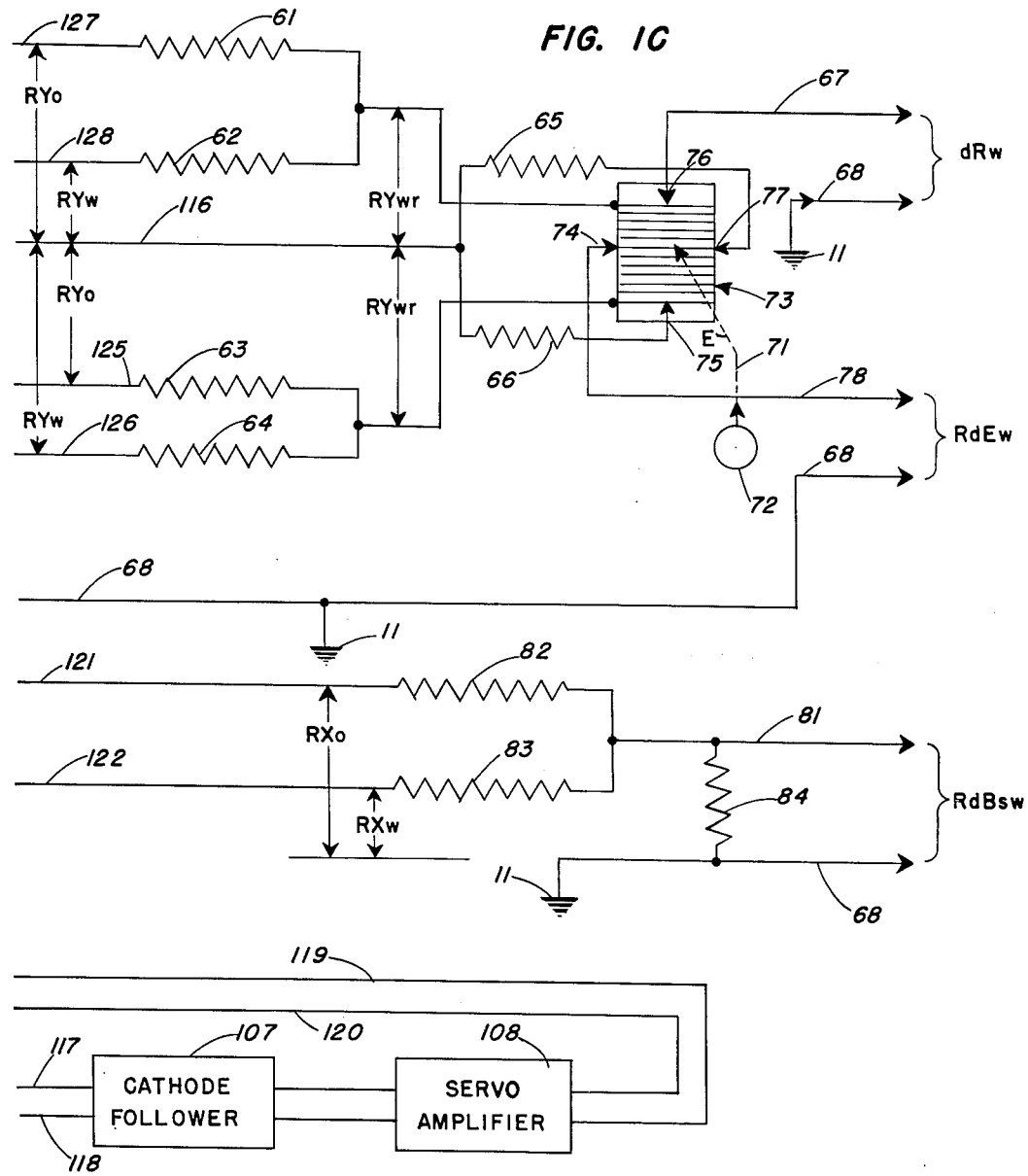

June 5, 1956    C. W. MILLER    2,749,039
WIND RESOLUTION APPARATUS
Filed April 26, 1949    4 Sheets-Sheet 4

INVENTOR
CARLTON W. MILLER
BY
ATTORNEY

United States Patent Office 2,749,039
Patented June 5, 1956

2,749,039

WIND RESOLUTION APPARATUS

Carlton W. Miller, Rochester, N. Y., assignor, by mesne assignments, to the United States of America as represented by the Secretary of the Navy Application April 26, 1949, Serial No. 89,599

7 Claims. (Cl. 235—61.5)

This invention relates to apparatus for wind resolution particularly suitable for use with ship bourne gun fire control systems, and more particularly to apparatus for resolving the velocity and direction of the wind, and speed and direction of the vessel, into components of wind velocity lying along the coordinates of target motion which are utilized in the gun fire control apparatus.

The apparatus of the instant invention is particularly well adapted for use with the invention described and claimed in the copending application of Ivan A. Getting for Gun Fire Control Method and System, Serial No. 61,558, filed November 23, 1948.

In accordance with a preferred embodiment of the invention, a plurality of inputs are supplied to computing apparatus. These inputs correspond to the ship's speed and direction, or course, and to the wind velocity and direction, and in the computing apparatus these input quantities are resolved into correction terms or quantities for making wind corrections to the rate vectors of a moving target in range, elevation, and traverse. The term "wind resolution" as employed herein is defined as the process of taking information as to wind factors including velocity and direction of wind and ship's speed and direction, resolving them vectorially into one or more components of wind velocity lying along one or more of the coordinates to be utilized in fire control apparatus, and/or computing correction terms to be utilized for correcting other gun fire control information to take account of wind factors.

One of the objects of the invention is to provide new and improved wind resolution apparatus.

Another object of the invention is to provide new and improved wind resolution apparatus characterized by simplicity of construction and accuracy of computation.

Another object is to provide new and improved wind resolution apparatus employing a plurality of complex wound potentiometer resolvers for computation purposes, the elements of the resolvers being positioned by suitable servo apparatus.

A further object is to provide new and improved wind resolution apparatus in which the computed terms are quickly and continually corrected in accordance with changes in the speed and course of the vessel and changes in the velocity and direction of the wind.

Other objects and advantages will be apparent from the following description taken in connection with the accompanying drawings, in which:

Figs. 1A, 1B, and 1C taken together comprise a schematic electrical circuit diagram of apparatus suitable for practicing the method of the invention; and Fig. 2 comprises a simplified schematic diagram of the circuit of Figs. 1A, 1B, and 1C.

In the description of the invention, the following nomenclature is employed:

B'r'—Director train. The angle between the fore and aft axis of own ship and the plane through the line of sight perpendicular to the deck, measured in the deck plane clockwise from the bow.

B'r'p—Director train corrected for horizontal parallax.

B—Bearing measured in horizontal plane.

Bw—True direction of true wind. The angle between north and the direction from which the true wind is blowing, measured in a horizontal plane clockwise from north.

Bws—Wind angle. The angle between a vertical plane containing the line of sight and the direction from which the true wind is blowing, measured in a horizontal plane clockwise from the direction from which the wind is blowing.

Co—Own ship course. The angle between the north and south vertical plane and the vertical plane through the fore and aft axis of own ship measured in a horizontal plane clockwise from the bow.

E—Elevation measured in the vertical plane.

$dR_w$—Range rate correction due to line of sight wind. A correction term applied to range rate to compensate for the effect on shell velocity due to the component of relative wind which lies along the line of sight.

R—Range (present) of target.

$RdB_{sw}$—Linear traverse rate correction due to cross wind. A correction term applied to linear traverse rate to compensate for the effect on shell velocity due to the cross wind.

$RdE_w$—Linear elevation rate correction due to elevation wind. A correction term applied to linear elevation rate to compensate for the effect on shell velocity due to the component of relative wind perpendicular to the line of sight in a vertical plane.

So—Own ship speed. The speed of own ship relative to the earth.

Sw—True wind speed. The horizontal velocity of true wind with respect to the earth.

Xo—Horizontal cross component of own ship velocity. The horizontal component of own ship velocity perpendicular to the vertical plane through the line of sight, positive when from right to left looking along the line of sight. Approximated by $Xo = So \sin B'r'p$.

Xw—Cross wind due to true wind. The component of true wind perpendicular to the vertical plane through the line of sight. (Positive when cross wind is from left to right.) Approximated by $Xw = Sw \sin Bws$.

Xwr—Relative cross wind. The component of relative wind perpendicular to the vertical plane through the line of sight. (Positive when cross wind is from left to right.) ($Xwr = Xw - Xo$.)

Yo—Horizontal range component of own ship velocity. The horizontal component of own ship velocity in the vertical plane through the line of sight, negative when along the line of sight. Approximated by $Yo = So \cos B'r'p$.

Yw—Range wind due to true wind. The horizontal component of true wind in the vertical plane through the line of sight. (Positive when along the line of sight.) ($Yw = -Sw \cos Bws$.)

Ywr—Relative range wind. The horizontal component or relative wind in the vertical plane through the line of sight. (Positive when along the line of sight.) ($Ywr = Yw - Yo$.)

e—Placed before a basic quantity means error signal for that quantity.

'—A prime indicates quantity is measured with respect to the deck.

Particular reference is made now to the drawings for an understanding of the invention, and in particular to Figs. 1A, 1B, and 1C thereof. A resistance network comprising resistor 13, potentiometer 16, and resistor 12 connected in series, is connected between a suitable source of potential, not shown, of the order of −200 v. D.-C. to ground and the lead 68, which is maintained at ground potential by ground 11.

3

An additional resistance network comprising, in series, resistor 14, potentiometer 17, and resistor 15, is connected to the positive terminal of a source of potential of the order of 200 volts to ground, and the lead 68. The arms of potentiometers 16 and 17 are operatively connected by coupling 22 to a range servomotor 21 so that the arms are positioned by the quantity R.

Resistor 18 is connected from the arm of potentiometer 16 to lead 68, and the arm of potentiometer 16 is connected by way of potentiometer 23, potentiometer 24, and resistor 25, to the arm of potentiometer 17. The arm of potentiometer 17 is connected by way of potentiometer 27, potentiometer 26, and resistor 28 to the arm of potentiometer 16. The junction between potentiometers 23 and 24 is connected to lead 68, and the junction between potentiometers 26 and 27 is connected to lead 68.

The arms of potentiometers 23 and 24 are operatively connected by a coupling 32 to an So hand wheel 31 which is also connected by the aforementioned coupling 32 to an So indicator dial 33. The arms of potentiometers 23 and 24 are accordingly positioned by the quantity So.

The arms of potentiometers 26 and 27 are operatively connected by coupling 37 to Sw hand knob 36 which also has connected thereto the Sw dial 38; the arms of the potentiometers 26 and 27 are accordingly positioned by the quantity Sw.

The arm of potentiometer 23 is connected by way of lead 112 and resistor 34 to one terminal of resolver 59, whereas the arm of potentiometer 24 is connected by lead 113 and resistor 35 to the other terminal of resolver 59. The D.-C. resolver 59 is a specially wound potentiometer which may be constructed and arranged as follows: 4 contacts are spaced 90° apart around a circle and pick off of a rotating flat square potentiometer card four direct current voltages equal, respectively, to $+kE \sin \theta$, $+kE \cos \theta$, $-kE \sin \theta$, and $-kE \cos \theta$ where E is the direct current voltage representing a vector to be resolved and applied across the potentiometer card, $k$ is a constant slightly less than 0.5, and $\theta$ is the angle through which the card has been rotated from the position defined as zero. The rotation of the card of 59 is accomplished by coupling 57 to a B′r′p servomotor 58, the card of potentiometer 59 being positioned in accordance with changes in the quantity B′r′p.

One arm of potentiometer 59 designated by the reference numeral 53 is operatively connected by way of lead 127 and resistor 61 to one terminal of an additional potentiometer resolver 73 which may be constructed similarly to resolver 59. Arm 54 of potentiometer 59 is operatively connected by lead 121 and resistor 82 to lead 81. Arm 55 of potentiometer 59 is connected by way of lead 125 and resistor 63 to the other terminal of the aforementioned potentiometer resolver 73. Arm 56 of potentiometer resolver 59 is connected by way of resistor 60 and by way of resistor 48 to arm 47 of a third potentiometer resolver designated by the reference numeral 43 and which may be similar to resolver 59. The junction between resistors 60 and 48 is connected to lead 68 and thence to ground at 11.

The arm of potentiometer 26 is connected by way of lead 114 and resistor 41 to one terminal of the winding of potentiometer resolver 43, while the arm of potentiometer 27 is connected by way of lead 115 and resistor 42 to the other terminal of the winding of the resolver 43. Arm 44 of resolver 43 is connected by way of lead 128 and resistor 62 to the upper terminal of the winding of aforementioned resolver 73. Arm 45 of resolver 43 is connected by way of lead 122 and resistor 83 to lead 81. Arm 46 of resolver 43 is connected by way of lead 126 and resistor 64 to the lower terminal of resolver 73. Arm 47 of resolver 43 is connected as previously described. The potentiometer card of resolver 43 is rotated in an amount corresponding to the quantity Bws by the

4 shaft coupling 51 to a Bws servomotor 109, hereinafter to be more fully described.

A signal representing the quantity Bws is obtained as follows: A Bw handknob 86 operatively connected to generator 89 by shaft 87 positions the shaft or control element of generator 89 so that the output thereof applied to leads 91, 92, and 93 represents the quantity Bw, generator 89 being suitably connected to a source of alternating current potential, not shown, of the order of 115 v., A. C., 60 cycles. The dial 88 indicates the value of Bw applied to the generator. The voltages from generator 89 representing the quantity Bw are applied to a differential generator 97 together with voltages from leads 98, 99, and 100 representing the quantity B′r′, these last named voltages having been obtained from generator 96 which has the shaft or control element thereof positioned by coupling 95 to a train motor 94 which may move the director of the gun fire control system in train in the quantity B′r′. Generator 96 is energized from a suitable source of potential, not shown, of the order of 115 v., A. C., 60 cycles.

Differential generator 97 is so constructed and arranged that the output thereof represents the quantity $B'r'-Bw$, this output being applied to shaft 104 which is connected to a control transformer 105.

Also applied to control transformer 105 by shaft 51 is the quantity Bws obtained from aforementioned Bws servomotor 109. Applied to control transformer 105 from leads 101, 102, and 103 are voltages respectively representative of the ship's course or the quantity Co, these having been obtained from elsewhere on the vessel, for example, the ship's compass. Control transformer 105 is so constructed and arranged that the output thereof represents the quantity eBws. This eBws output signal is applied to a filter 106 and thence by way of leads 117 and 118 to a cathode follower 107. The output of the cathode follower 107 is applied to the servo amplifier 108, and the output of the servo amplifier 108 is applied by way of leads 119 and 120 to the aforementioned Bws servomotor 109, which is operatively connected to a siutable source of alternating current potential, not shown, of the order of 115 volts, 60 cycles. Accordingly, the servomotor 109, and the coupling shaft 51 connected thereto, represent the quantity Bws for positioning the potentiometer card of the aforementioned resolver 43.

The card of aforementioned potentiometer 73 is positioned by coupling 71 to elevation servomotor 72 by the quantity E or true elevation. Arm 74 of resolver 73 is connected to lead 78. Arm 75 of resolver 73 is connected by way of resistor 66 and lead 116 to lead 68. Arm 76 of resolver 73 is connected to lead 67. Arm 77 of resolver 73 is connected by way of resistor 65 and lead 116 to lead 68.

In the operation of the aforedescribed circuits, voltages corresponding to the quantity R are obtained from the arms of both the potentiometers 16 and 17, and applied to the potentiometer networks shown which are so constructed and arranged that the voltages between leads 112 and 113 and ground correspond to the quantity RSo, while the voltages between leads 114 and 115 and ground correspond to the quantity RSw.

Resolver 59 is so constructed and arranged that the voltages between leads 127 and 125 and ground correspond to the qantity RYo, and the voltage between lead 121 and ground corresponds to the quantity RXo, the quantities Yo and Xo having been previously defined.

Resolver 43 is so constructed and arranged that the voltages between leads 128 and 126 and ground correspond to the quantity RYw, and the voltage between lead 122 and ground corresponds to the qantity RXw, the quantities Yw and Xw having been previously defined.

The signals or voltages corresponding to the quantities RXo and RXw are added in the adding network shown comprising resistors 82, 83, and 84 to produce the previously defined correction signal R$d$B$sw$ developed between leads 81 and 68, Fig. 1C.

The aforementioned RY$o$ and RY$w$ voltages are added in the networks comprising resistors 61, 62, 63, and 64 to produce two voltages corresponding to the quantity RY$wr$, the quantity Y$wr$ having been previously defined. The RY$wr$ voltages are applied to the aforementioned resolver 73, which is constructed and arranged so that the signal or voltage between lead 67 and ground corresponds to the aforedefined correction $d$R$w$, while the voltage between lead 78 and ground corresponds to the aforedefined correction R$d$E$w$.

These three correction voltages $d$R$w$, R$d$E$w$, and R$d$B$sw$ are suitable for use with the system disclosed and claimed in the application of Ivan A. Getting aforesaid for controlling the firing of a gun.

Reference is made now to Fig. 2, in which is shown schematically a simplified version of the circuit of Figs. 1A, 1B, and 1C. The operation of the circuit of Fig. 2 will be readily understood in view of the foregoing description of the circuit of Figs. 1A, 1B, and 1C, and need not be described in detail, the operation of similarly designated elements being substantially identical in the two circuits.

Preferably all elements of the aforedescribed apparatus which are energized by 110 v., A.-C., 60 cycles, are energized from the same source.

It is contemplated that suitable choice of component values and potential polarities be made to permit operation of the circuit in the desired manner.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States of America is:

1. In wind resolution apparatus on own ship of the character disclosed, in combination, first means for obtaining a first voltage proportional to the range, R, along a line of sight from the apparatus on own ship to a target, second means operatively connected to said first means for multiplying said first R voltage by own ship speed, S$o$ and obtaining a pair of voltages proportional to the product RS$o$, third means operatively connected to said second means for resolving said RS$o$ voltages to obtain voltages corresponding respectively to range times horizontal range component of own ship velocity, RY$o$, and range times horizontal cross component of own ship velocity, RX$o$, fourth means for obtaining a second voltage proportional to the target range, R, means to produce a quantity proportional to cross wind, S$w$, fifth means operatively connected to said fourth means for multiplying said second R voltage by the quantity S$w$ and obtaining a pair of voltages proportional to the quantity RS$w$, sixth means operatively connected to said fifth means for resolving said RS$w$ voltages by the wind angle quantity B$ws$ between true wind and line of sight to obtain a pair of voltages corresponding respectively to the quantities R times range wind, Y$w$, and R times cross wind, X$w$, seventh means operatively connected to said third and sixth means for adding said RX$o$ and RX$w$ voltages to obtain the wind correction voltage corresponding to the quantity R$d$B$sw$, to compensate for the effect on shell velocity of cross wind, eighth means operatively connected to said third and sixth means for adding said RY$o$ and RY$w$ voltages to obtain two voltages corresponding to the product of range times relative range wind, RY$wr$, and means for resolving said RY$wr$ voltages by the target angle of elevation quantity E and obtaining therefrom wind correction voltages corresponding respectively to the range rate correction due to line of sight wind, $d$R$w$, and linear elevation rate correction due to elevation wind, R$d$E$w$.

2. In wind resolution apparatus of the character disclosed, in combination, means for obtaining a voltage representative of the true wind direction quantity B$w$, means for obtaining an additional voltage representative of the director train quantity B′$r$′, differential generator means adapted to have both said voltages applied thereto and to produce a shaft displacement corresponding to the difference quantity B′$r$′−B$w$, control transformer means adapted to have said last named shaft displacement applied thereto, said control transformer means also having applied thereto a shaft displacement corresponding to the angle between line of sight and true wind, B$ws$, said control transformer also having applied thereto a voltage corresponding to the own ship course quantity C$o$, said control transformer generating an output signal corresponding to the instantaneous error in wind angle, $e$B$ws$, filter means having said $e$B$ws$ signal applied thereto, cathode follower means energized from said filter means, a wind angle servo amplifier operatively connected to said cathode follower means to be energized therefrom, and wind angle servomotor means energized from said servo amplifier and operatively connected to said control transformer to supply said wind angle shaft displacement thereto.

3. In wind resolution apparatus of the character disclosed for directing an own ship gun to a target, in combination, first means for obtaining a voltage corresponding to the true wind direction, B$w$, second means for obtaining a voltage corresponding to the director train, B′$r$′, third means operatively connected to said first and second means and having both said voltages applied thereto, said third means producing a shaft rotation corresponding to the difference quantity, B′$r$′−B$w$, control transformer means having said shaft rotation applied thereto, means for supplying a voltage signal proportional to own ship course signal, C$o$, to the control transformer, a second means supplying a shaft rotation to the control transformer, which rotation is proportional to the line of sight-true wind angle, B$ws$, said control transformer producing a voltage proportional to instantaneous errors, $e$, in said angle B$ws$ which is fed back into said second means to produce a rotation of said shaft which reduces $e$B$ws$ to zero, means producing a voltage signal proportional to the product, RS$w$, of range of target, R, and true wind speed, S$w$, means receiving the shaft rotation proportional to said B$ws$ from the said second means and the voltage signal proportional to said product RS$w$ to produce output signals proportional, respectively, to the product RX$w$ of range R and cross wind X$w$ and the product RY$w$ of range R and range component of true wind, means for producing signals proportional, respectively, to the product RX$o$ of range R and cross component of own ship velocity, and the product, RY$o$, of range R and range component of own ship velocity, Y$o$, means to which said RX$w$ and RX$o$ are fed to produce a signal proportional to linear traverse rate correction due to cross wind, R$d$B$ws$, means to which said RY$w$ and RY$o$ are fed to produce an output signal proportional to the product, RY$wr$, of range R and relative range wind Y$wr$, a shaft rotation proportional to target elevation, E, means receiving said signal RY$wr$ and the shaft rotation E to produce output signals proportional to range rate correction due to line of sight wind, $d$R$w$, and linear elevation rate correction due to elevation wind, R$d$E$w$, said quantities R$d$B$ws$, R$d$E$w$ and $d$R$w$ being proportional to the corrections required to correct the gun for the effect of wind on the firing.

4. In wind resolution apparatus for a gun order computer of the character disclosed, in combination, means for obtaining a voltage proportional to the own ship-to-target range, R, means to produce a shaft displacement analogous to own ship speed, S$o$, means operatively connected to the first and second named means for obtaining two voltages of opposite sign corresponding to the product, RS$o$, resolver means having said two voltages applied thereto, said resolver means being constructed and arranged to provide a pair of voltages corresponding to the product of range and range component of own ship velocity, RY$o$, and the product of range and cross component of own ship velocity, R$X_o$, means for obtaining a voltage signal proportional to true wind direction, $B_w$, means for obtaining a voltage signal proportional to director train, B'r', means for obtaining a voltage signal proportional to own ship course, $C_o$, means connected to the $B_w$, B'r', and $C_o$ producing means to produce a signal proportional to wind angle, $B_{ws}$, means for obtaining a voltage signal proportional to product of range and true wind, R$S_w$, means receiving the signal proportional to said R$S_w$ and the signal proportional to said $B_{ws}$ to produce voltage signal proportional to the product of range and range component of wind, R$Y_w$, and the product of range and cross component of wind, R$X_w$, means for obtaining a signal proportional to elevation, E, means for receiving said signals R$Y_w$, R$Y_o$ and E to produce voltage signal proportional to range rate correction due to line of sight wind, $dR_w$, and elevation rate correction due to elevation wind, R$dE_w$, means for receiving said signals R$X_w$ and R$X_o$ to produce a voltage signal proportional to traverse rate correction due to cross wind, R$dB_{ws}$, said $dR_w$, R$dE_w$ and R$dB_{ws}$ signals being proportional to the corrections required to correct the positioning of a gun for wind.

5. In wind resolution apparatus for a gun order computer of the character disclosed, in combination, means for obtaining a voltage proportional to the own ship-to-target range, R, means operatively connected to said first named means for obtaining two voltages of opposite sign corresponding to the product of range and true wind speed, R$S_w$, resolver means having said two voltages applied thereto, said resolver means being constructed and arranged to provide a pair of voltages corresponding to the quantities product of range and range wind, R$Y_w$, and the product of range and cross wind, R$X_w$, means for obtaining from R voltage signals proportional to the product of range and range component of own ship velocity, R$Y_o$, and the product of range and cross component of own velocity, R$X_o$, means for obtaining a signal proportional to angle of elevation, E, means receiving said R$Y_o$, R$Y_w$ and E signals to produce voltage signals proportional to range rate correction due to line of sight wind, $dR_w$, and elevation rate correction due to elevation wind, R$dE_w$, means for obtaining a wind angle, $B_{ws}$, signal, means receiving the $B_{ws}$, R$X_o$ and R$X_w$ signals to produce a signal proportional to traverse rate correction due to cross wind, R$dB_{ws}$, said $dR_w$, R$dE_w$ and R$dB_{ws}$ signals being proportional to the corrections required to correct the positioning of a gun for the effect of wind.

6. In wind resolution apparatus of the character disclosed, in combination, means for obtaining a first voltage proportional to the own ship-to-target range, R, means to produce a shaft displacement analogous to own ship speed, $S_o$, means operatively connected to said first named means for obtaining two voltages of opposite sign corresponding to the product, R$S_o$, first resolver means having said two voltages applied thereto, said first resolver means being constructed and arranged to provide a pair of output voltages corresponding to the product of range and range component of own ship speed, R$Y_o$, and the product of range and cross component of own ship speed, R$X_o$, means for obtaining a second voltage proportional to the quantity R, means operatively connected to said last named means for obtaining two voltages of opposite sign corresponding to the product of range and true wind velocity, R$S_w$, second resolver means having said last named two voltages applied thereto, said second resolver means being constructed and arranged to provide a pair of output voltages corresponding, respectively, to the product of range and range wind, R$Y_w$, and the product of range and cross wind, R$X_w$, means for obtaining a signal proportional to wind angle $B_{ws}$, means receiving said $B_{ws}$, R$X_o$ and R$X_w$ signals to produce a signal proportional to traverse rate correction due to cross wind, R$dB_{ws}$, means for obtaining a signal proportional to elevation E, means receiving said R$Y_o$, R$Y_w$ and e signals to produce a signal proportional to range rate correction due to line of sight wind $dR_w$ and a signal proportional to elevation rate correction due to elevation wind R$dE_w$, said R$dB_{ws}$, $dR_w$ and R$dE_w$ signals being proportional to the correction required to correct the lay of a gun for the effect of wind.

7. Apparatus according to claim 6 wherein said means receiving the R$Y_o$, R$Y_w$ and E signals is additionally characterized as including third resolver means constructed and arranged to supply the $dR_w$ and R$dE_w$ corrections, and said means receiving the $B_{ws}$, R$Y_o$ and R$X_w$ includes an adding network means constructed and arranged to supply the R$dB_{sw}$ correction.

References Cited in the file of this patent
UNITED STATES PATENTS

| | | |
|---|---|---|
| 2,399,726 | Doyle | May 7, 1946 |
| 2,434,274 | Lakatos | Jan. 13, 1948 |
| 2,467,646 | Agins | Apr. 19, 1949 |
| 2,488,448 | Tounew | Nov. 15, 1949 |

FOREIGN PATENTS

| | | |
|---|---|---|
| 164,765 | Great Britain | June 23, 1921 |
| 458,274 | Great Britain | Dec. 16, 1936 |